(12) United States Patent
Clouse (10) Patent No.: US 7,101,234 B2
(45) Date of Patent: Sep. 5, 2006

(54) PEDAL MOUNT FOR AN ELECTRIC TROLLING MOTOR

(75) Inventor: Gary L. Clouse, Gallatin, TN (US)

(73) Assignee: Stratos Boats, Inc., Murfreesboro, TN (US)

( * ) Notice: Subject to any disclaimer, the term of this patent is extended or adjusted under 35 U.S.C. 154(b) by 0 days.

(21) Appl. No.: 10/895,810

(22) Filed: Jul. 21, 2004

(65) Prior Publication Data

US 2006/0019554 A1    Jan. 26, 2006

(51) Int. Cl.
*B60L 15/20* (2006.01)

(52) U.S. Cl. .......................................... 440/7

(58) Field of Classification Search .................... 440/6, 440/7; 114/153, 361, 364; 74/478, 478.5
See application file for complete search history.

(56) References Cited

U.S. PATENT DOCUMENTS

| | | | |
|---|---|---|---|
| 4,008,500 A | 2/1977 | Hall, Jr. | |
| 4,130,079 A | 12/1978 | Rhorer et al. | |
| 4,151,807 A | 5/1979 | Black, Jr. | |
| 4,386,918 A | 6/1983 | Matthews et al. | |
| 4,515,567 A | 5/1985 | Wilson | |
| 4,527,983 A | 7/1985 | Booth | |
| 4,555,233 A | 11/1985 | Klammer et al. | |
| 4,565,529 A | 1/1986 | Aertker et al. | |
| 4,569,663 A | 2/1986 | Miller et al. | |
| 4,587,388 A | 5/1986 | Cavin | |
| 4,597,356 A | 7/1986 | McCaghren et al. | |
| 4,604,066 A | 8/1986 | Davatz | |
| 4,613,801 A | 9/1986 | Tatom, Jr. | |
| 4,614,900 A | 9/1986 | Young | |
| 4,631,034 A * | 12/1986 | Menne et al. | 440/7 |
| 4,702,713 A | 10/1987 | Lee | |
| 4,722,706 A | 2/1988 | Young | |
| 4,728,307 A | 3/1988 | Burgess | |
| 4,734,066 A | 3/1988 | Burgess | |
| 4,820,208 A | 4/1989 | Phillips, Sr. | |
| 4,824,408 A | 4/1989 | Aertker et al. | |
| 4,838,817 A | 6/1989 | Travis | |
| 4,950,187 A | 8/1990 | Smith | |
| 4,964,820 A | 10/1990 | Rayborn | |
| 4,966,566 A | 10/1990 | Baird | |
| 4,995,010 A | 2/1991 | Knight | |
| 5,069,642 A | 12/1991 | Henderson | |
| 5,078,070 A | 1/1992 | Clement | |
| 5,088,943 A | 2/1992 | Henderson | |
| 5,108,322 A | 4/1992 | Henderson | |
| 5,112,256 A | 5/1992 | Clement | |
| 5,129,845 A | 7/1992 | Henderson | |
| 5,171,173 A | 12/1992 | Henderson et al. | |
| 5,180,925 A | 1/1993 | Lieb | |
| 5,202,835 A | 4/1993 | Knight | |
| 5,386,368 A | 1/1995 | Knight | |

(Continued)

OTHER PUBLICATIONS

"Genesis Bow-Mount, Minn Kota Home," http://www.minnkotamotors.com/_swf/index.asp, 1 page (Publicly known prior to the filing date of the present application).

*Primary Examiner*—Stephen Avila
(74) *Attorney, Agent, or Firm*—Merchant & Gould P.C.

(57) ABSTRACT

A boat including a hull and a floor positioned within the hull. A pedal mount is secured to the floor. The pedal mount defines a pedal recess sized to receive a pedal for controlling a trolling motor.

8 Claims, 7 Drawing Sheets

U.S. PATENT DOCUMENTS

| | | |
|---|---|---|
| 5,465,633 A | 11/1995 | Bernloehr |
| 5,496,198 A | 3/1996 | King |
| 5,507,242 A | 4/1996 | LeBlanc et al. |
| 5,551,899 A | 9/1996 | Hatcher |
| 5,580,287 A | 12/1996 | Wieringa |
| 5,606,930 A | 3/1997 | LeBlanc et al. |
| 5,607,136 A | 3/1997 | Bernloehr |
| 5,669,794 A | 9/1997 | Knight et al. |
| 5,892,338 A | 4/1999 | Moore et al. |
| 5,954,551 A | 9/1999 | King |
| 5,975,002 A * | 11/1999 | Rieger ................. 114/343 |
| 6,054,831 A | 4/2000 | Moore et al. |
| 6,126,497 A | 10/2000 | Stockton |
| 6,190,216 B1 | 2/2001 | King |
| 6,254,441 B1 | 7/2001 | Knight et al. |
| 6,276,975 B1 | 8/2001 | Knight |
| 6,325,684 B1 | 12/2001 | Knight |
| 6,325,685 B1 | 12/2001 | Knight et al. |
| 6,369,542 B1 | 4/2002 | Knight |
| 6,394,859 B1 | 5/2002 | Knight et al. |
| 6,431,923 B1 | 8/2002 | Knight et al. |
| 6,468,117 B1 | 10/2002 | Healey |
| 6,554,667 B1 | 4/2003 | Dodson |

* cited by examiner

PEDAL MOUNT FOR AN ELECTRIC TROLLING MOTOR

TECHNICAL FIELD

The principles disclosed herein relate generally to boats. More particularly, this disclosure relates to a system for mounting a pedal used to control an electric trolling motor of a boat.

BACKGROUND

Fishing boats often include trolling motors for providing relatively low amounts of thrust for propelling the boats quietly through the water at speeds suitable for trolling or casting. Trolling motors are most commonly battery powered and are typically mounted at either the bow or the stern of the boat. To facilitate hands-free operation, it is common for a trolling motor to be controlled by a foot pedal. Foot pedals can be used for steering a trolling motor as well as for controlling the level of thrust provided by the trolling motor. Foot pedals are coupled to trolling motors by any number of means such as mechanical cables, electrical wires and remote wireless connections. Example trolling motors are disclosed in U.S. Pat. Nos. 6,431,923; 5,465,633; and 5,112,256, the disclosures of which are incorporated herein by reference in their entireties.

SUMMARY

One inventive aspect of the present disclosure relates to a pedal mount configured to receive a pedal such that the pedal is more easily operated.

Another inventive aspect of the present disclosure relates to a pedal mount having storage features for promoting improved deck organization.

A further inventive aspect of the present disclosure relates to a pedal mount that can be illuminated by a backlight.

Still another inventive aspect of the present disclosure relates to a trolling motor and foot pedal configuration that promotes improved deck organization by routing a steering control line from the foot pedal, beneath the floor of the boat, to the trolling motor.

A variety of examples of desirable apparatus features or methods are set forth in part in the description that follows, and in part will be apparent from the description, or may be learned by practicing various aspects of the disclosure. The aspects of the disclosure may relate to individual features as well as a combination of features. It is to be understood that both the forgoing general description and the following detailed description are explanatory only, and are not restrictive of the broad aspects of the various inventions.

DETAILED DESCRIPTION

Figure 1:
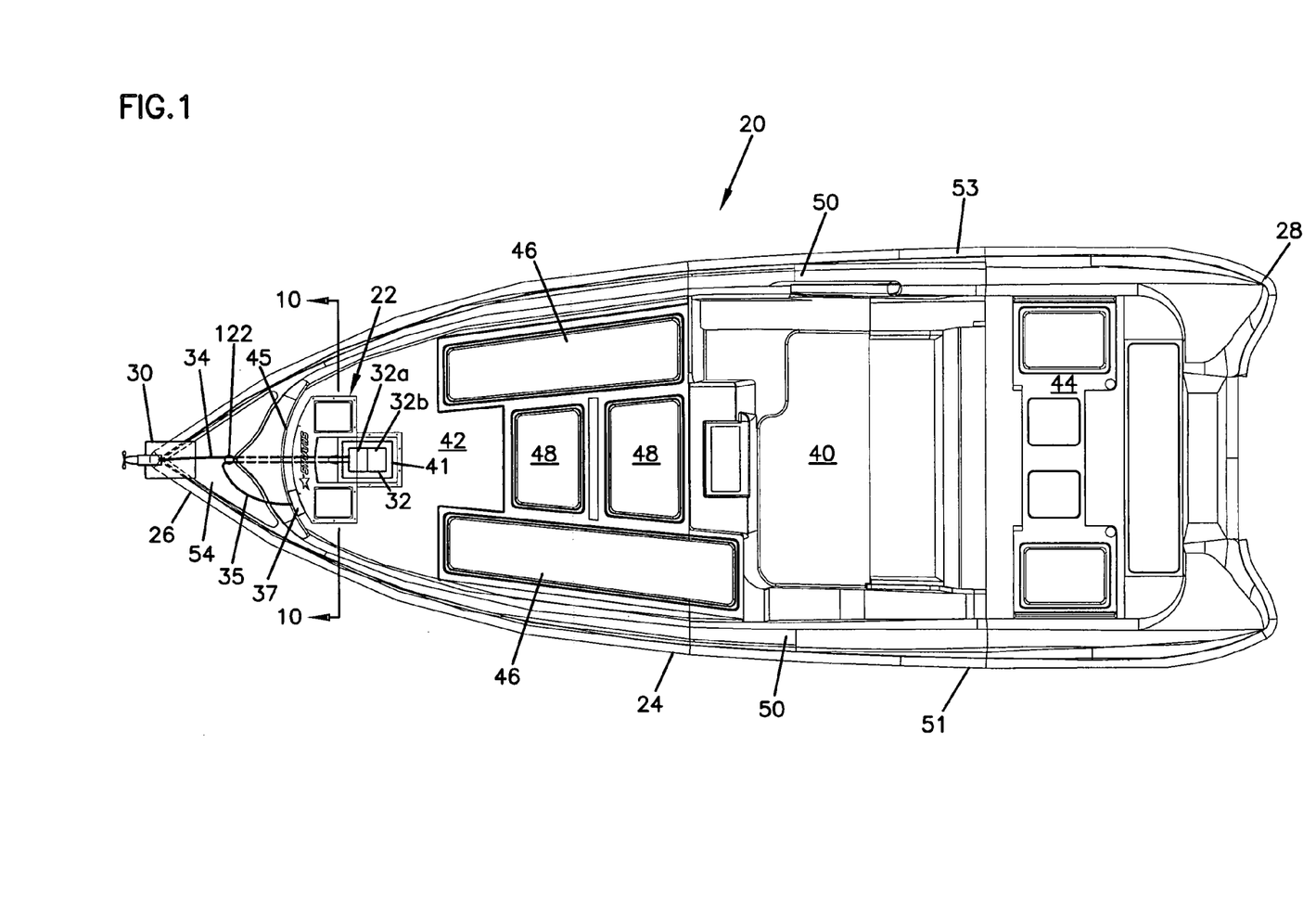
FIG. 1 is a top, plan view of a boat including a pedal mount having features that are examples of inventive aspects in accordance with the principles of the present disclosure.

FIG. 1 illustrates a boat 20 equipped with a pedal mount 22 having features that are examples of inventive aspects in accordance with the principles of the present disclosure. The boat 20 includes a hull 24 having a bow 26 and a stem 28. A trolling motor 30 (e.g., an electric trolling motor) is mounted at the bow 26. The pedal mount 22 is located adjacent the bow 26, and a pedal 32 for controlling the trolling motor 30 is positioned at the pedal mount 22. A control line 34 (e.g., a mechanical cable, an electrical wire or other structure) couples the pedal 32 to the trolling motor 30. In alternative embodiments, the pedal 32 can be coupled to the trolling motor 30 by a wireless connection.

Referring still to FIG. 1, the boat 20 includes a cockpit region 40, a raised front casting platform 42 positioned forward of the cockpit region 40, and a raised rear casting platform 44 positioned rearward of the cockpit region 40. Rod storage compartments 46 and general storage compartments 48 are provided beneath the raised front casting platform 42. Preferably, the compartments are covered by hinged doors that can be pivoted open to access the interior of the compartments. When closed, the pivoting doors are preferably flush with the remainder of the front casting platform so as to form a continuous casting platform floor.

The boat 20 also includes a top deck 50 that extends along the port and starboard sides 51, 53 of the boat 20. The top deck 50 also includes a nose region 54 that forms a platform at the nose of the bow 26. The trolling motor 30 is mounted at the nose region 54. As shown in FIG. 1, the pedal mount 22 is incorporated into the front casting platform 42 at a location immediately rearward of the nose region 54.

Referring to FIGS. 2–5, the pedal mount 22 includes a main body 70 having a top surface 72. The main body 70 also includes a central portion 100 at which a pedal recess 74 is defined. The main body 70 further includes wing portions 102 that project laterally outwardly from opposite sides of the central portion 100. Each wing portion 102 defines a storage recess 104. A rearward extension 101 of the central portion 100 projects rearwardly from the wing portions 102 such that the wing portions 102 and the central portion 100 cooperate to define a generally "T" shaped configuration. A front end 106 of the main body 70 is rounded/curved to match a corresponding contour 45 of the front casting platform 42 adjacent the bow 26.

The main body 70 of the pedal mount 22 can be made of any number of different materials. In one embodiment, the main body 70 is molded from a plastic material.

The pedal recess 74 of the pedal mount 22 is shown having a generally rectangular configuration defined by opposing side walls 78, and by front and rear walls 80 and 82 that extend between the side walls 78. The bottom of the pedal recess 74 is enclosed by a bottom wall 84. The side walls 78 and the rear wall 82 extend generally perpendicularly upwardly from the bottom wall 84. The front wall 80 is aligned at an oblique angle relative to the bottom wall 84, and angles upwardly from the bottom wall 84 to the top surface 72 of the main body 70.

The pedal recess 74 preferably has a depth selected to enhance the user's ability to readily manipulate the pedal. In certain embodiments, the depth is selected so that the top of the pedal is generally flush with the top side of the front casting platform. In one embodiment, the pedal recess 74 has a depth D (see FIG. 10) in the range of 2 to 4 inches. In another embodiment, the depth D is in the range of 2 to 3 inches. In still another embodiment, the depth D is about 2½ inches. The pedal recess 74 also has a width W (see FIG. 3) that in one embodiment is in the range of 8 to 12 inches, and in another embodiment about 10 inches. The pedal recess 74 further has a length L (see FIG. 3) that in one embodiment is in the range of 10 to 20 inches, and in another embodiment is about 15 inches. Of course, the sizes identified above are merely exemplary and in alternative embodiments the sizes may be varied.

The storage recesses 104 of the pedal mount 22 are each defined by a set of side walls 110 arranged in a generally rectangular configuration. Each set of side walls 110 extends generally perpendicularly between the top surface 72 of the main body 70 and a corresponding bottom lip 112. The bottom lips 112 surround through-holes 114 defined at the bottom of each storage recess 104. The storage recesses 104 are sized to receive drop-in tackle storage trays 116 of the type shown in FIGS. 6–9. The drop-in storage trays 116 have perimeter flanges 118 that seat upon the bottom lips 112 when mounted in the storage recesses 104. The trays 116 also include separate storage compartments 117 that are inset within the through-holes 114 when the trays 116 are mounted within the storage recesses 104. While it is preferred for the trays 116 to be removable, in alternative embodiments trays or other storage structures can be integrally connected to the main body 70 or connected to the main body by other means such as fasteners so as to not be readily removable from the storage recesses 104.

Figure 2:
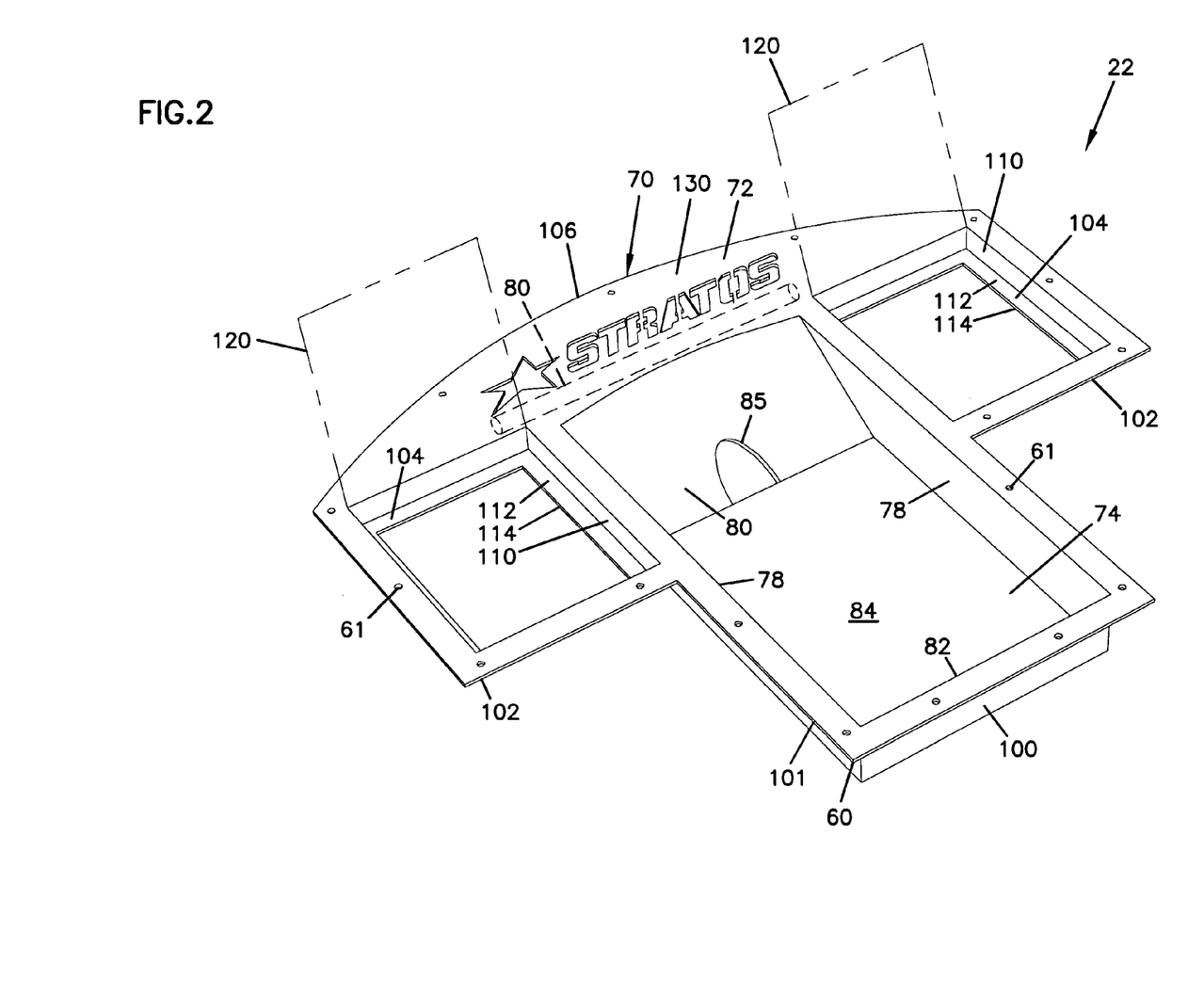
FIG. 2 is a perspective view of the pedal mount shown in FIG. 1 in isolation from the boat.

Referring to FIG. 2, the pedal mount 22 also preferably includes covers 120 for covering the storage recesses 104. In certain embodiments, the covers 120 can be pivotally connected to the main body 70 of the pedal mount 22.

Figure 3:
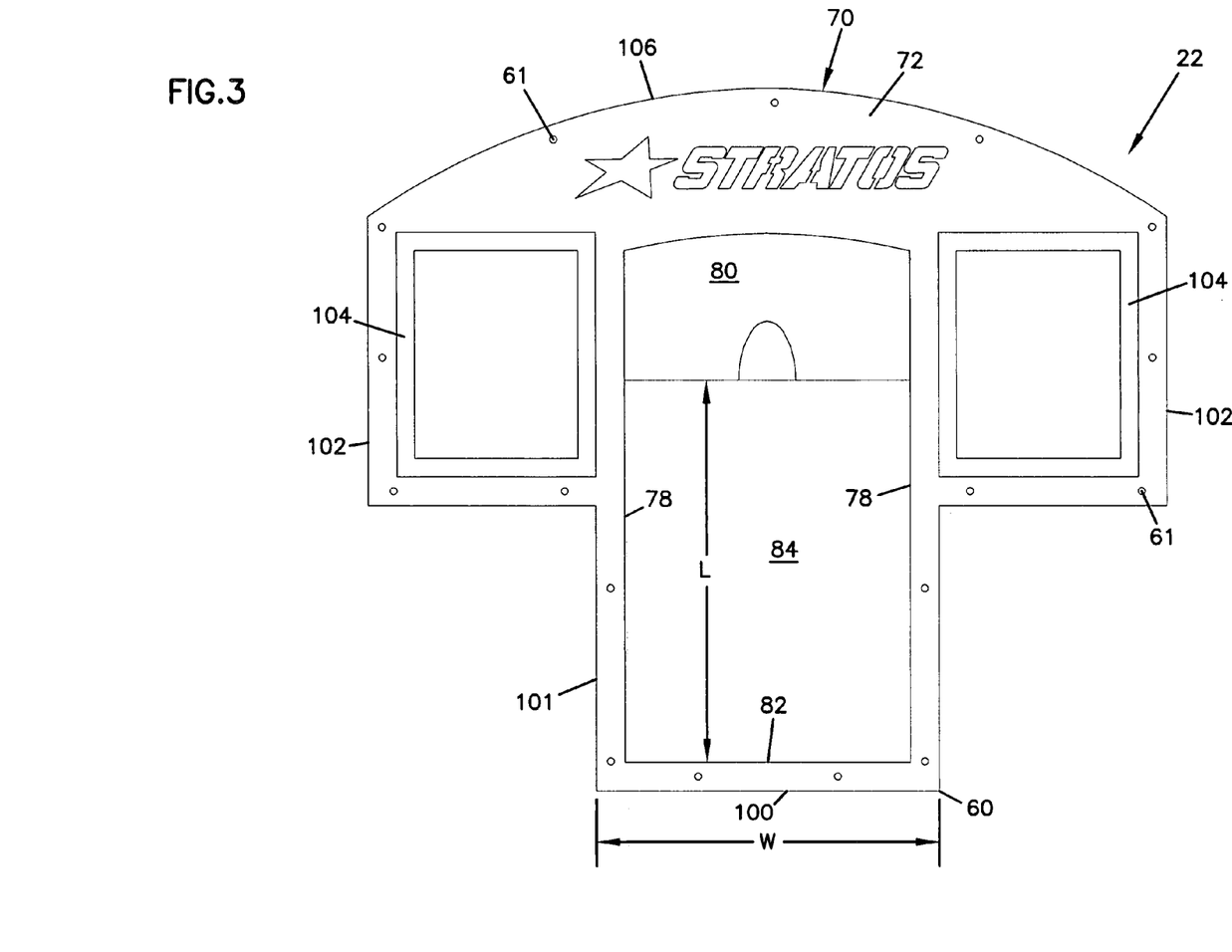
FIG. 3 is a top, plan view of the pedal mount of FIG. 2.
Figure 4:
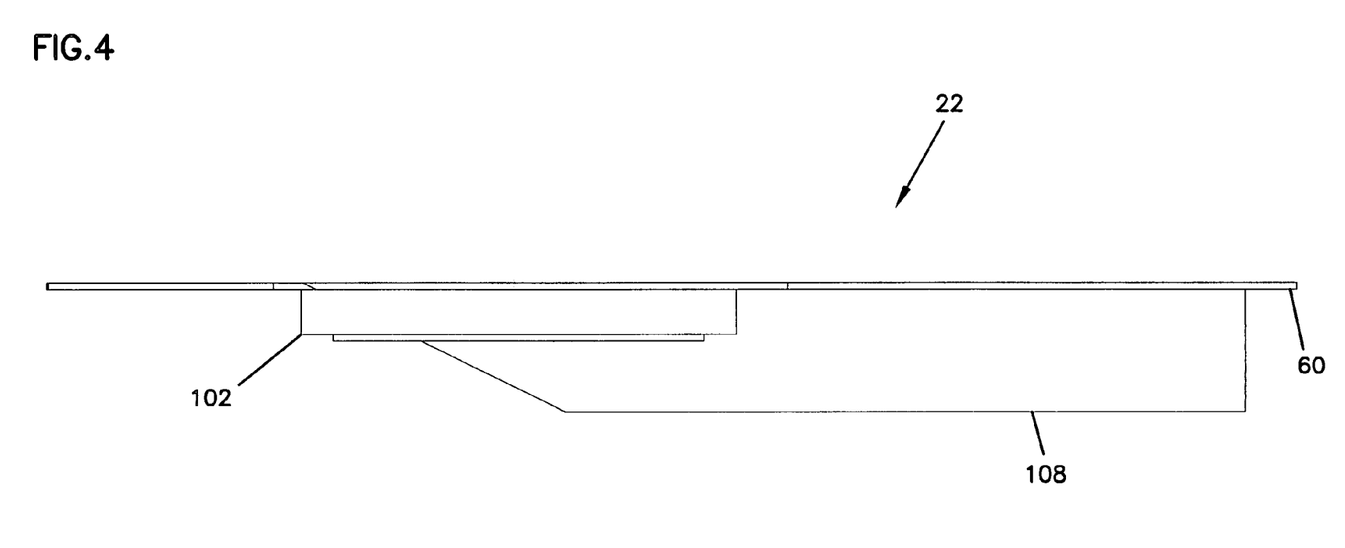
FIG. 4 is a side view of the pedal mount of FIG. 2.
Figure 5:
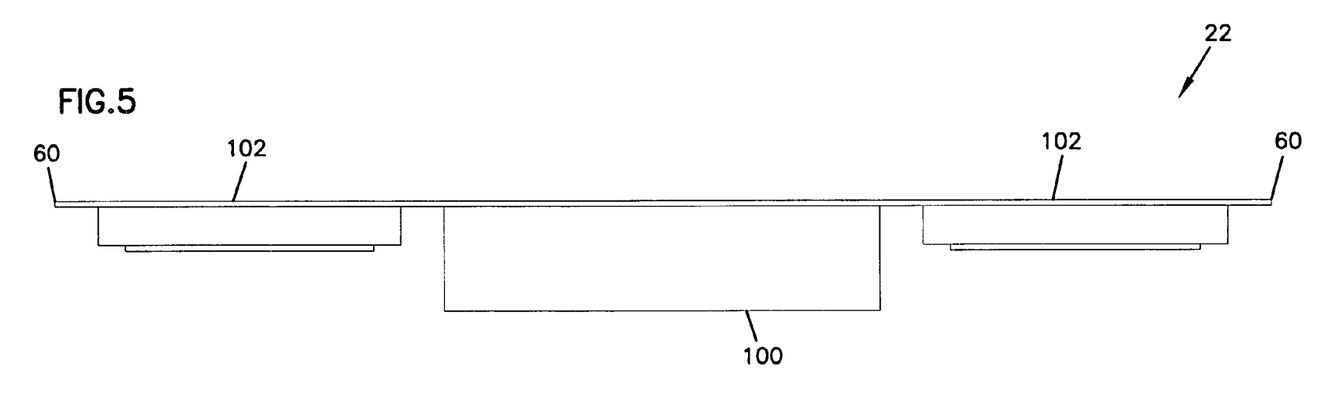
FIG. 5 is a rear view of the pedal mount of FIG. 2.
Figure 6:
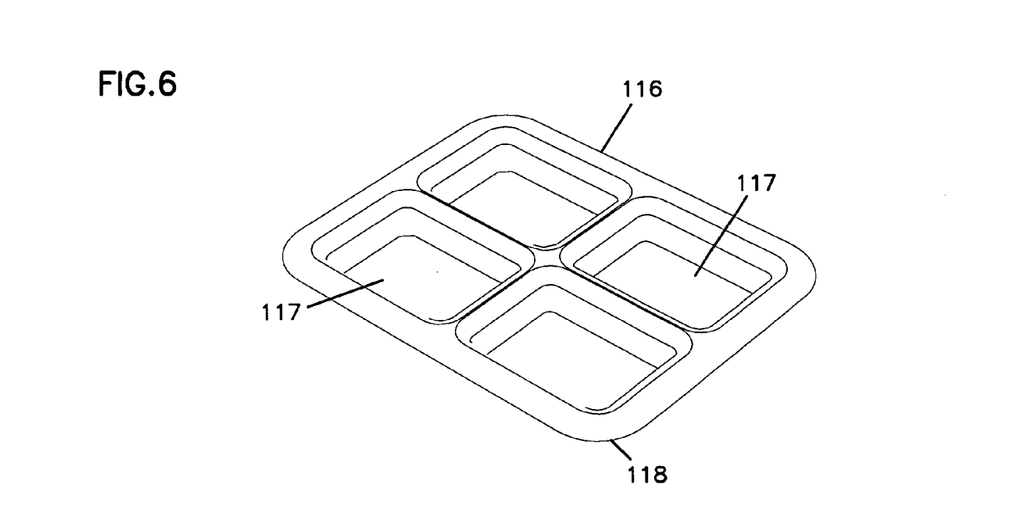
FIG. 6 is a perspective view of a drop-in tackle storage tray adapted to be used with the pedal mount of FIG. 2.
Figure 7:
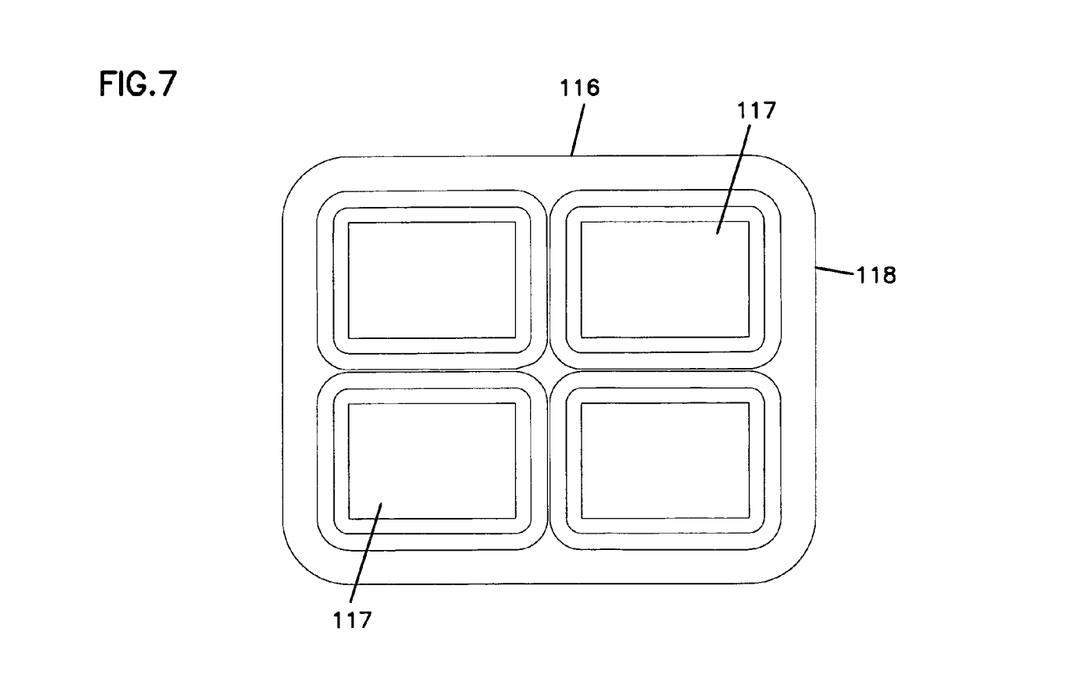
FIG. 7 is a top, plan view of the tackle storage tray of FIG. 6.
Figure 8:
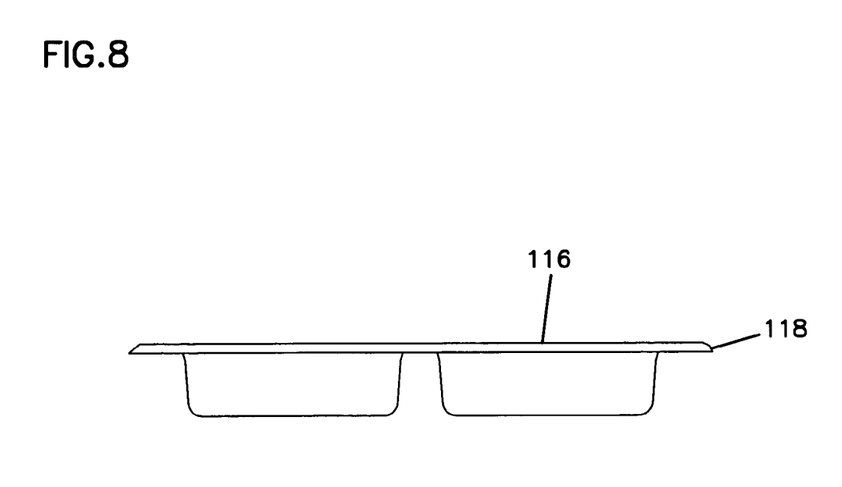
FIG. 8 is a side view of the tackle storage tray of FIG. 6.
Figure 9:
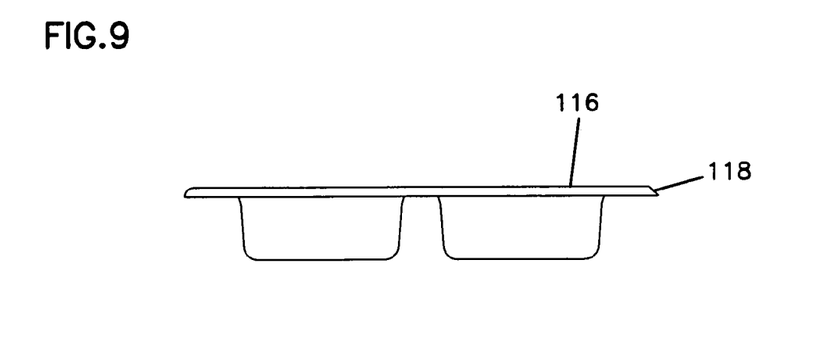
FIG. 9 is a rear view of the tackle storage tray of FIG. 6.

The main body 70 is preferably equipped with structure for securing the pedal mount 22 to a floor or other boat structure. For example, referring again to FIGS. 2–5, the pedal mount 22 includes a mounting flange 60 that defines the perimeter of the main body 70. As depicted in FIG. 3, the mounting flange 60 defines openings 61 for receiving fasteners such as screws, bolts, rivets or other fasteners adapted for securing the pedal mount to the floor of the front casting platform 44. Alternatively, other fastening techniques such as adhesive materials (e.g., epoxy, resin, or other materials) could be used to secure the pedal mount 22 to the floor.

Figure 10:
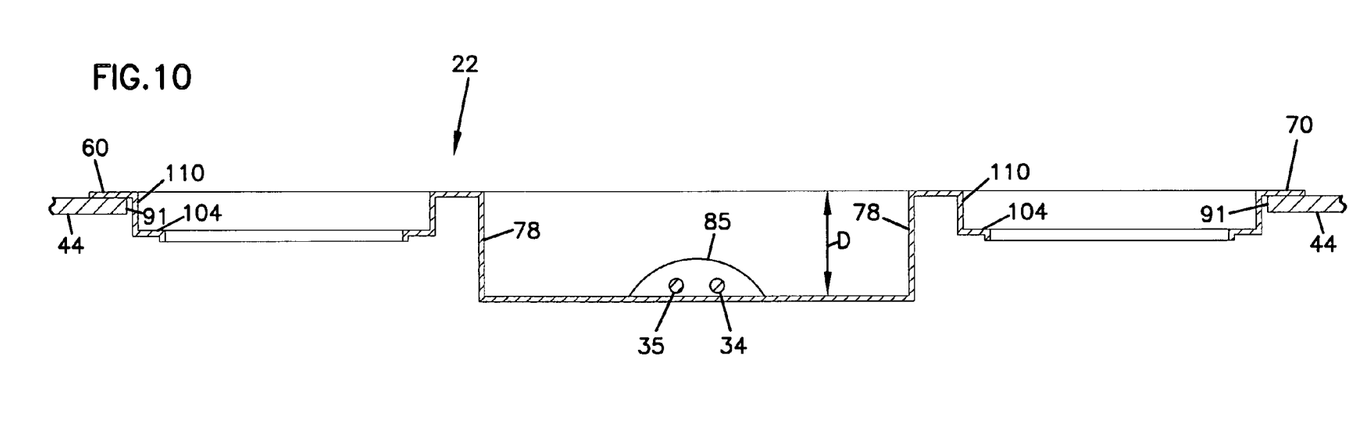
FIG. 10 is a cross-sectional view taken along section line 10—10 of FIG. 1.

The cross sectional view of FIG. 10 depicts how the pedal mount 22 is incorporated into the platform 44. Referring to FIG. 10, an opening 91 is provided (e.g., cut or formed) through the platform 44. The pedal mount 22 is dropped within the opening 91 such that pedal recess 74 and the storage recesses 104 are inset within the opening 91, and the mounting flange 60 seats on the top side of the platform 44. Fasteners inserted through openings 61 secure the pedal mount 22 to the platform 44.

The front wall 80 of the pedal recess 74 defines an opening 85 for allowing the control line 34 to be routed through the main body 70 from the top side of the main body to an underside of the main body. In an example embodiment, the control line 34 (e.g., a mechanical or electrical cable) is routed from the pedal 32 downwardly through the opening 85 to a region located beneath (i.e., lower than) the floor of the boat. The control line 34 is then routed upwardly through an opening 122 (see FIG. 1) in the nose region 54. From the opening 122, the control line 34 is routed to the trolling motor 30. By routing the control line 34 under the main body 70 of the pedal mount 22 and lower than the floor of the boat, the control line 34 is hidden from view and prevented from being a tripping hazard. Therefore, the limited space at the front casting platform is made more usable. Other lines such as a power cable 35 can be routed through the opening 85 in a similar manner. In the case of cable 35, the cable 35 is routed under the floor to opening 122, and then routed to a trolling motor control panel 37. The control panel 37 has a power socket into which a plug at the end of the cable 35 can be plugged in. The panel 37 can also include switches such as tilt/trim switches and indicators such as battery power indicators. The panel 37 can be coupled to a power source such as one or more batteries. In the depicted embodiment, cables can be routed under the port top deck to connect the panel 37 to batteries located adjacent the stern.

In other embodiments, the control line 34 and the power cable 35 can be routed over the top of the floor in a more conventional configuration. For example, certain mechanical cables may have bending radius restrictions that make routing such cables beneath the deck difficult.

For night fishing, it is preferred for the boat 20 to include a backlight 80 (see FIG. 2) for illuminating at least a portion of the main body 70 of the pedal mount 22. It is preferred for at least a portion of the main body 70 to be made of a material that is translucent (e.g., clear or opaque) such that light from the backlight 80 can pass through the main body 70. As shown in FIG. 2, the backlight 80 is located directly beneath a translucent front portion 130 of the pedal mount 22. The backlight 80 can be an electric bulb, LED, or any other source of illumination. The backlight 80 can be accessed by removing one of the drop-in trays and reaching through the through-hole 114 provided at the corresponding storage recesses 104. The backlight can be used to illuminate a text or design such as a logo.

In the depicted embodiment, the pedal mount 22 has a modular construction in which the pedal recess 74 and the storage recesses 104 are provided on a common unit that is secured to the floor of the boat. In alternative embodiments, the various features may be provided integrally with the floor.

Referring again to FIG. 1, the pedal 32 includes a forward portion 32a and a rearward portion 32b and is pivotably mounted to a base 41. The base 41 can be fixedly mounted to the bottom wall 84 of the recess 74 by conventional techniques such as fasteners. As shown in FIG. 1, the base 41 is mounted to allow the pedal to be pivoted between forwardly flipped and rearwardly flipped orientations.

With regard to the foregoing description, it is to be understood that changes may be made in detail, especially with respect to the shape and arrangement of the parts. It is intended that the specification and depicted aspects be considered illustrative only and not limiting with respect to the broad underlying concepts of the present disclosure.

What is claimed is:

1. A boat comprising:
   a hull including a bow and a stern;
   a floor positioned within the hull;
   a pedal mount secured to the floor, the pedal mount defining a pedal recess sized to receive a pedal for steering a trolling motor, the pedal mount further defining a storage recess positioned adjacent the pedal recess; and
   a tackle storage tray positioned within the storage recess.

2. The boat of claim 1, wherein the pedal mount defines storage recesses on opposite sides of the pedal recess.

3. The boat of claim 1, wherein the tackle storage tray is removable from the storage recess.

4. The boat of claim 1, further comprising a cover for covering the storage recess.

5. The boat of claim 1, wherein the pedal mount includes a mounting flange for securing the pedal mount to the floor.

6. A boat comprising:
    a hull including a bow and a stern;
    an electric trolling motor mounted at the bow;
    a foot pedal for steering the trolling motor;
    a floor positioned within the hull, the floor including a front casting platform; and
    a pedal-mounting module secured to the front casting platform, the pedal-mounting module including a main body having a top surface, the pedal-mounting module defining a pedal recess in which the foot pedal is positioned, the pedal-mounting module further including storage trays positioned on opposite sides of the pedal recess, the storage trays including portions recessed relative to the top surface of the main body of the pedal mounting module.

7. The boat of claim 6, wherein the storage trays are removable from the main body of the pedal mounting module.

8. The boat of claim 7, further wherein the pedal-mounting module includes covers for covering the trays.

* * * * *